Dec. 22, 1953      L. S. TWOMEY      2,663,169
MANIPULATION OF NITROGEN-CONTAMINATED NATURAL GASES
Filed Aug. 4, 1949      4 Sheets-Sheet 1

INVENTOR.
L. S. Twomey

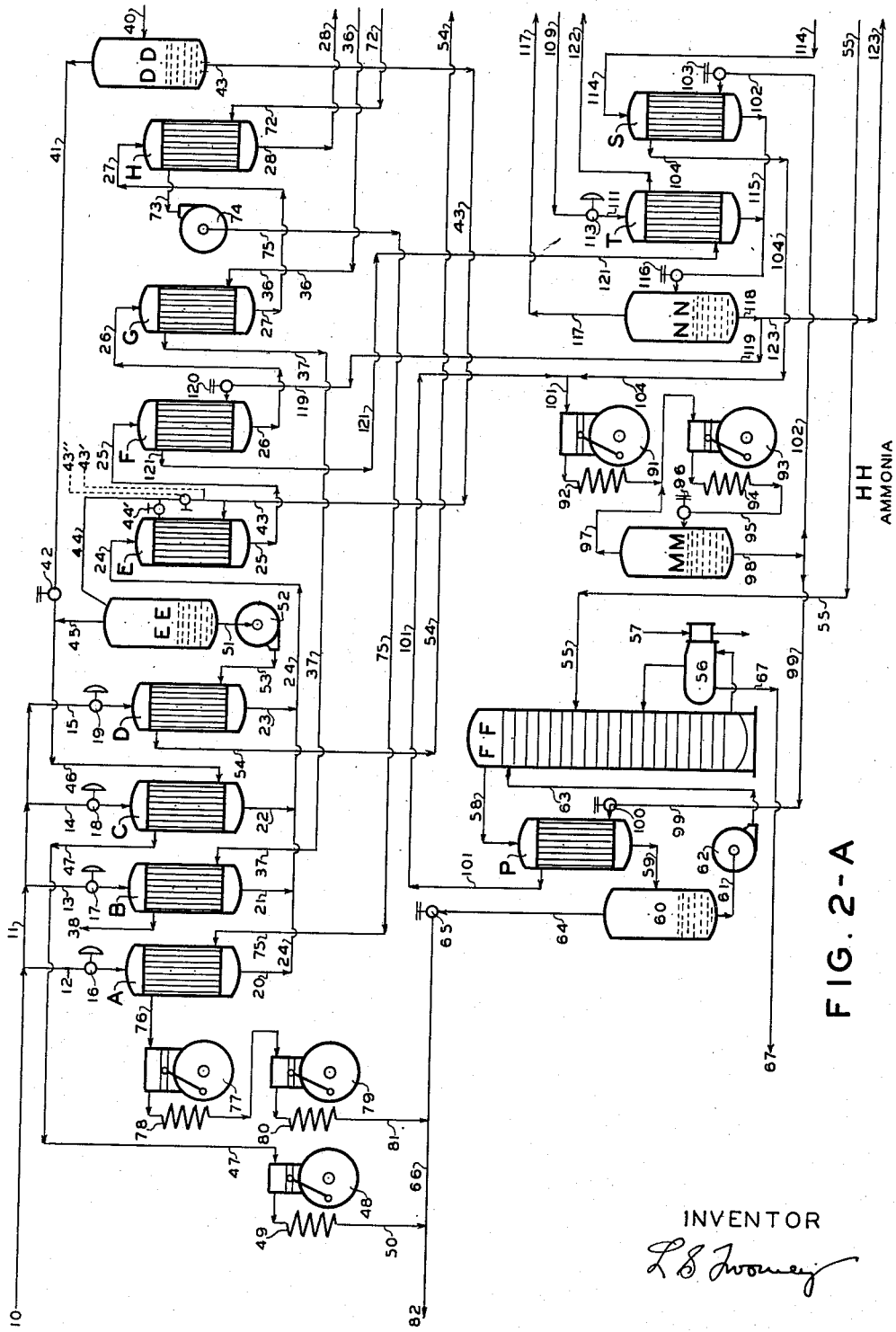

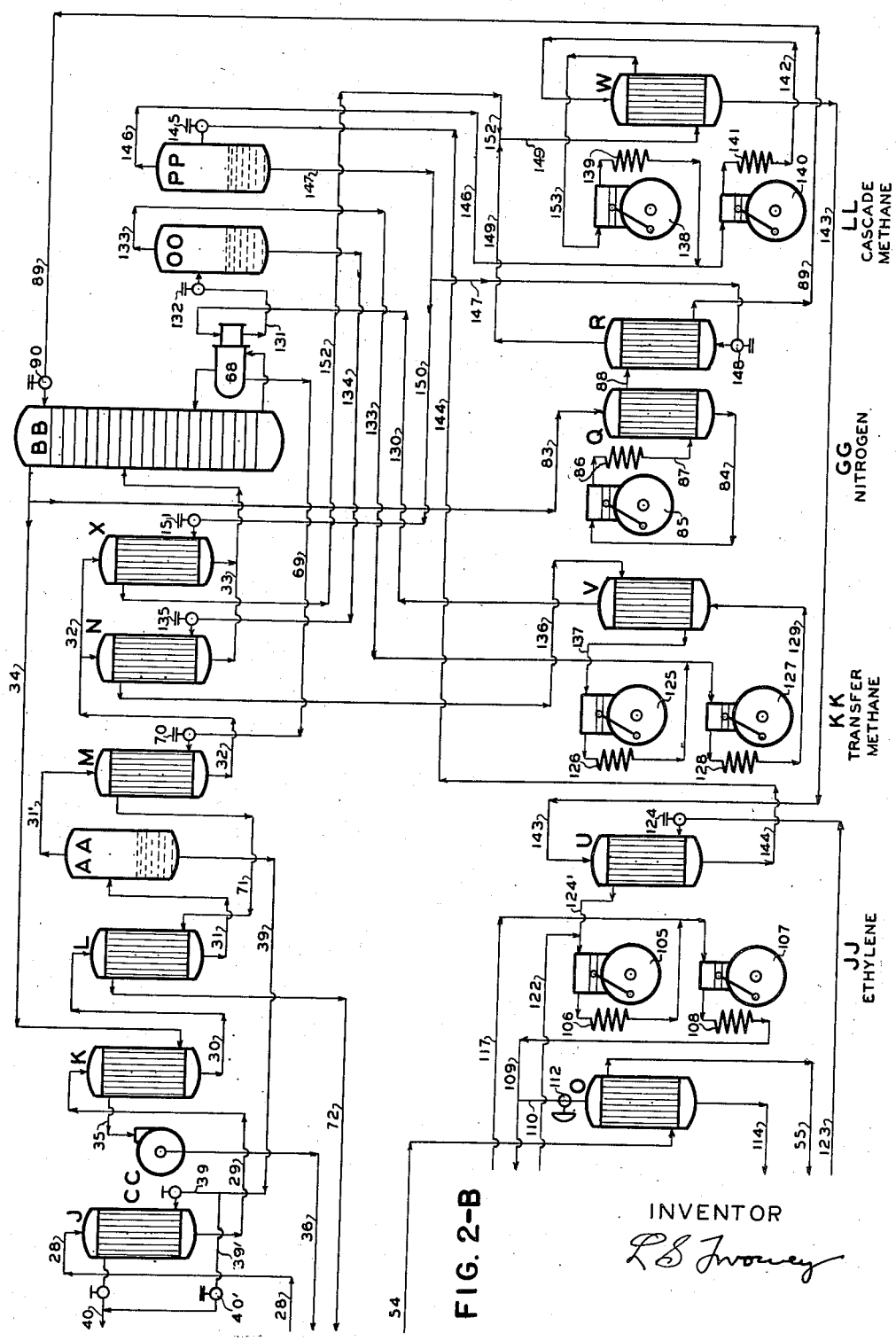
FIG. 2-B
INVENTOR
L. S. Twomey

Patented Dec. 22, 1953

2,663,169

UNITED STATES PATENT OFFICE 2,663,169

MANIPULATION OF NITROGEN-CONTAMINATED NATURAL GASES

Lee S. Twomey, Vista, Calif.

Application August 4, 1949, Serial No. 108,633

13 Claims. (Cl. 62—175.5)

This application relates to the transportation, purification, storage and distribution of natural hydrocarbon gases initially contaminated by material proportions of nitrogen.

Certain portions of the United States, notably western Kansas, southwestern Colorado, and the Texas Panhandle, produce great quantities of natural gas containing up to forty per cent by volume of nitrogen. The greater part of this gas finds a market only at a considerable distance from the field and must be transported through pipe lines for hundreds of miles, at a cost which often materially exceeds the value of the gas at the well-head.

The separation and rejection of part or all of the original nitrogen content has important advantages, even when this step is performed at the delivery end of the transmission line, and even greater advantages when the removal is effected before the gas is transported over a great distance. The step is particularly effective and advantageous when combined with storage of part of the purified gas at a point more or less adjacent to that at which it is distributed and used, or when the step of purification is combined with the recovery of liquid hydrocarbons from the purified gas. The nature of these advantages and the various manners in which they may best be realized will be referred to in detail hereinafter.

Various methods for separating the contaminating nitrogen from natural gas are available, the present specification describing only the general method in which separation is effected by partially liquefying the feed gas stream, parting the liquid and vapor phases thus produced, liquefying the vapor phase and fractionating it in a suitable column, rejecting the relatively pure nitrogen yielded by the column and recovering a bottom fraction rich in hydrocarbons, partially vaporizing the liquid phase in one or more stages, and separating the vapor produced in this partial vaporization as a hydrocarbon gas containing some nitrogen but useful as fuel, and fractionating the residual liquid for the separation of valuable higher boiling hydrocarbons from a fuel gas substantially free from nitrogen.

The invention may best be described with reference to the attached drawings and the following description thereof, in which:

Fig. 2A–2B is a flow sheet of an operation and assemblage of apparatus for performing the separation of nitrogen and providing the extraneous refrigeration required by the system.

Figure 1:
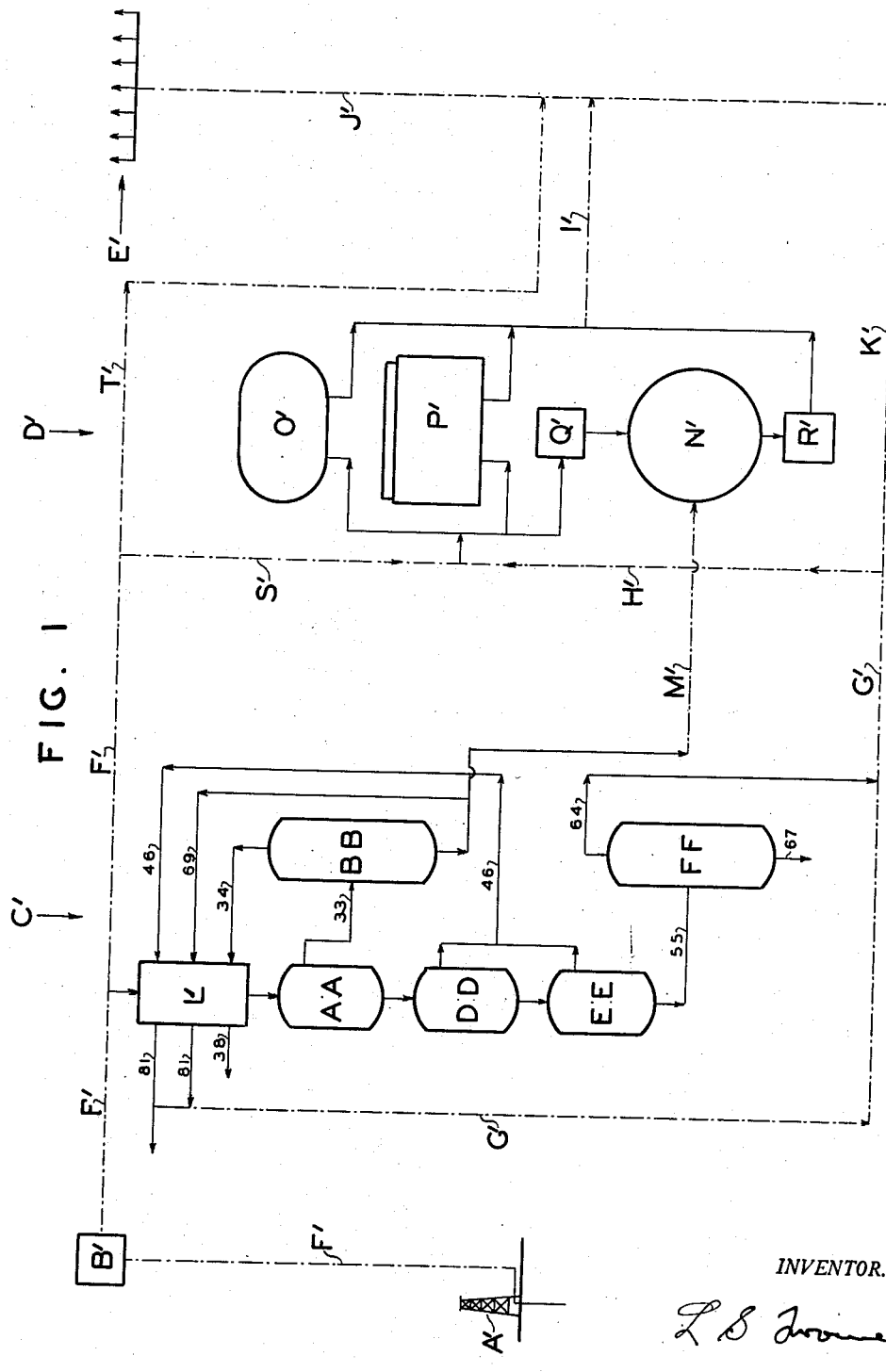
Fig. 1 is a diagram illustrating the essential steps of the process, devoid of detail and describing various permissible alternatives of procedure.

Referring first to Fig. 1, A' indicates a gas field producing nitrogen-contaminated natural gas; B' is a treating unit in which the gas is deprived of carbon dioxide, hydrogen sulfide and water vapor; C' is a fractionating system; D' is a gas storage system and E' is a distributing system such as a city gas service. The locations of elements A' and E' are, of course, fixed by circumstances and not controllable. The other three principal elements may be located as convenient, thus, the treating unit must be between the field and the fractionating plant but may be adjacent to either if they are separated; the fractionating plant and the storage plant (if provided) may each be adjacent to the field or adjacent to the distribution area or at a medial point, and finally, the fractionating plant and the storage plant may be closely adjacent or may be separated by any convenient distance.

Fig. 1 shows a line F'—F' connecting the field with the fractionating plant, with treating unit B' located anywhere between A' and C'; a gas line G'—H' connecting the fractionating plant with the storage plant; a liquid line M' connecting the fractionating plant with the storage plant, useful only if these two elements are closely enough adjacent to permit the transfer of a liquefied gas in liquid condition; a gas line G'—K'—J' connecting the fractionating plant directly with distribution and by-passing storage; a gas line I'—J' connecting storage with distribution; a gas line F'—S' connecting the field with storage and by-passing the fractionating plant, and a gas line F'—T' connecting the field with the distribution area and by-passing both fractionation and storage. With such lines, of lengths determined by the relative locations of the units, it is possible to take care of any desired alternatives of procedure.

The fractionating system consists first of a series or group of interchangers L' in which the feed gas is refrigerated, the partially liquefied gas passing through three separators or flash vessels AA, DD and EE in sequence maintained at successively increasing temperatures or decreasing pressures. The vapor from the first stage separator passes to a fractionating column BB in which a vapor rich in or, with careful fractionation, consisting substantially of nitrogen is withdrawn through conduit 34 and, after interchange against entering gas, is vented at 38 as waste nitrogen.

The vapors evolved in the second and third stage separators are combined, passing through conduit 46 to refrigerating system L' from which they are vented at 81 as a hydrocarbon gas containing some nitrogen.

The liquid withdrawn from the third stage separator through conduit 55 contains a variable proportion of methane and ethane, according to the conditions maintained in the separators, together with substantially all of the hydrocarbons heavier than ethane which were present in the feed gas. This liquid passes to a deethanizing column FF' from which the propane and heavier hydrocarbons are withdrawn at 67 while the vapor, consisting substantially of methane and ethane, is discharged through conduit 64.

The liquid collecting in the base of column BB, consisting substantially of methane and ethane, may be conducted in the liquid form through a conduit M' to a liquid storage vessel N', provided this vessel be close enough to the fractionating plant to permit such transmission. If the storage plant be widely separated from the fractionating plant, this liquid residue will pass through conduit 69 to the refrigerating unit L' from which it is discharged as a hydrocarbon-rich fuel gas. This gas passes through conduit G'—H' to gaseous phase pressure storage indicated at O' or to low pressure gaseous phase storage P' or to a liquefier Q' from which it passes into liquid storage N', to be withdrawn as required through a vaporizer indicated at R'. From either of these storage vessels the gas passes through conduit I'—J' to distributing system E', while in the absence of storage facilities the gas passes from the fractionating plant to distribution through conduit G'—K'—J'.

The gas parted from liquid in the second and third stage separators will vary in quality with variations in the conditions maintained in the series of separators. In any case it will be useful as fuel and may be withdrawn as such for plant use or local disposal, or if the specification for fuel gas at the delivery point or the economics of transmission permit, it may be introduced into conduit G' for admixture with the richer gases resulting from the two fractionations.

Fig. 2, consisting of the two Sheets 2A (left) and 2B (right) is a detailed flow sheet of a series of operations, following the general scheme above described, by which a gas containing a large proportion of nitrogen may be purified prior to long distance transmission. The same operations would prepare the purified gas for liquid storage at the delivery end of the line, with the single exception that the refrigerative value of the stored liquid is difficult or impossible to utilize in the fractionating plant, which therefore requires a greater amount of make-up refrigeration from an outside source such as the cascade.

In the ensuing description, all pressures are stated in pounds per square inch absolute and all temperatures in degrees Kelvin.

For the purpose of illustrating the functions of the cycle the natural gas produced at Hugoton, Kansas is taken as an example, the analysis of this gas being as follows, in mole per cents:

Nitrogen _____ 16.48
Methane _____ 71.96
Ethane _____ 6.32
Propane+ _____ 5.24

The gas is assumed to enter the cycle at 240# and the purified gas, from which the nitrogen and the propane+ have been separated, is to be delivered to the long distance pipe line at the same pressure.

The feed gas, previously deprived of water vapor and carbon dioxide to such extent as to avoid freezing of interchangers and the like, enters the system at 19 at about 305°. Passing through a distributing header 11, the gas supply is divided into four streams, passing respectively through conduits 12, 13, 14 and 15 and diaphragm control valves 16, 17, 18 and 19 into interchangers A, B, C and D. These control valves are responsive to the temperatures in outlet conduits 20, 21, 22 and 23 and are set to operate at the same temperature, thus dividing the feed stream between the interchangers in proportion to the amount of refrigeration available in each.

In element A, a portion of the feed gas stream is cooled by purified gas; in B another portion is interchanged against separated nitrogen; in C a third portion is interchanged against flashed vapors, and in D the remainder of the feed is interchanged against a cold liquid. The sources of these various cooling fluids will later be described. The four feed streams are collected in conduit 24 as a single stream.

The collected gas stream now passes through a series of interchangers in which it is progressively cooled. To avoid prolixity these cooling steps are listed, naming first the connecting conduit, indicated by a number, then the interchanger, indicated by a letter, then the kind of fluid against which the gas is interchanged and, finally, the temperature of the gas at the outlet of the interchanger. The sources of these fluids will later be described and it will be understood that the pressure of the gas is not reduced through this series other than by friction.

Starting with conduit 24, through E against a cold vaporizing liquid product, to 195° K.; 25 through F against expanded liquid ethylene, to 189°; 26 through G against expanded nitrogen, to 183°; 27 through H against purified gas, to 181°; 28 through J against a cold vaporizing liquid product, to 161°; 29 through K against unexpanded nitrogen, to 159°; 30 through L against a cold purified gas, to 153° K. At the outlet of interchanger L the pressure has dropped to about 230# and the temperature to 153°, the stream passing then through conduit 31 to first separator AA in which a vapor, constituting about 48% of the weight of gas fed to the system is parted from a liquid constituting the remaining 52%. The molal composition of the vapor is approximately

| | Per cent |
|---|---|
| Nitrogen | 28 |
| Methane | 72 | and of the liquid

| | Per cent |
|---|---|
| Nitrogen | 4.2 |
| Methane | 72.0 |
| Ethane | 12.9 |
| Propane+ | 10.9 |

Preferably the cooling of the feed gas entering separator AA should be to or below the temperature at which the proportion of the original propane of the feed gas remaining in the vapor phase equals the proportion of the total feed gas reduced to liquid phase by the cooling.

It is desirable to concentrate as much of the feed propane as possible in the liquid phase, in order to recover it later, together with heavier hydrocarbons, by fractionation of the liquid. It is also desirable to concentrate as little as possible of the feed nitrogen as possible in the liquid because, if in the liquid, it will undesirably contaminate the vapors flashed off in separators DD and EE, as will be described later.

Figure 3:
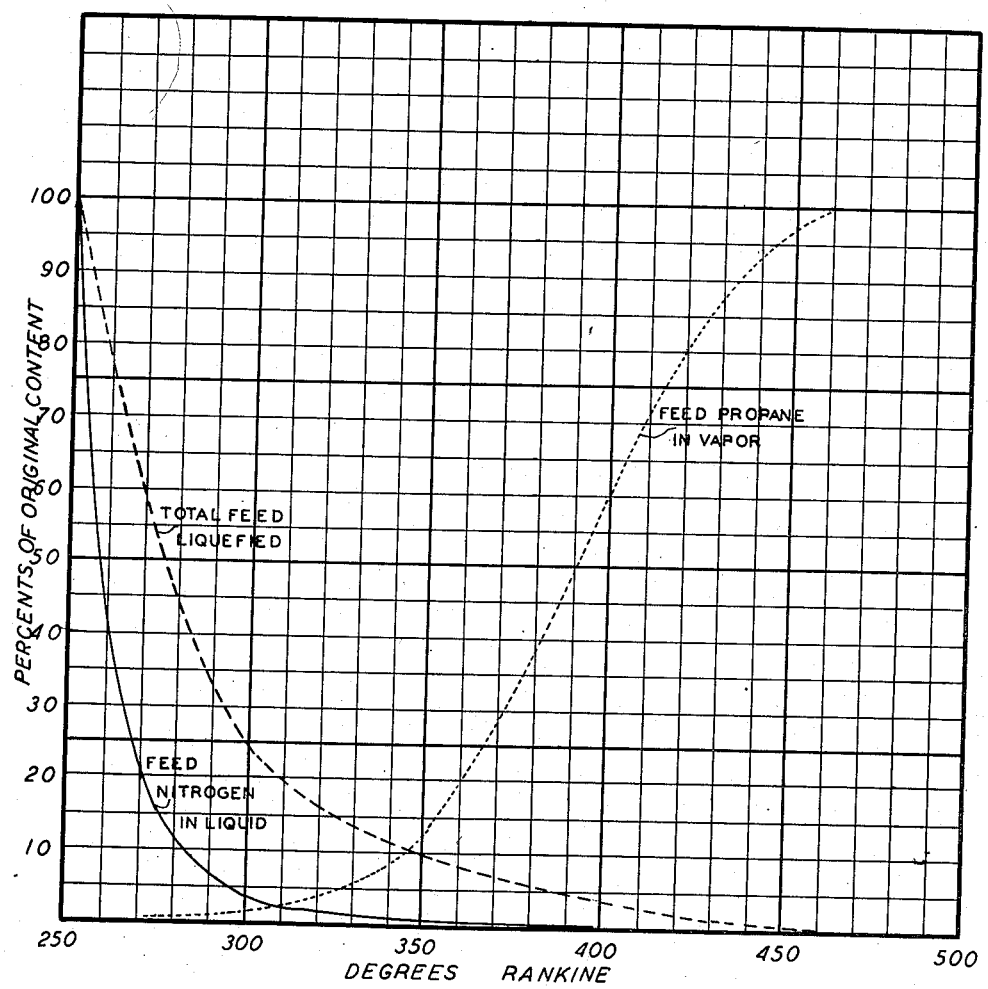
Fig. 3 shows the variation in the total feed liquefied, the nitrogen in the liquid and the propane in the vapor with change in temperature of partial liquefaction.

Fig. 3 shows, by means of curves, the variation of each of the three above discussed proportions with change in the temperature of partial liquefaction. Study of these curves supports the following conclusions.

Starting at room temperature, in decreasing the condensing temperature a point is reached where nitrogen begins to appear in the liquid and where the proportion of the feed propane remaining in the vapor is still very high. For some distance below this point, further decreases in temperature result in approximately commensurate decreases in the proportion of the feed propane in the vapor and approximately commensurate increases in the proportion of the feed nitrogen in the liquid.

With still further temperature decreases, the propane curve starts to flatten out and its condition of approximate commensurability with temperature is lost, so that a small temperature drop, sufficient to cause a presupposed increase in the proportion of feed nitrogen in the liquid, does not cause as large a decrease in the proportion of feed propane in the vapor as did a temperature change sufficient to cause an equal nitrogen increase in the higher temperature range. More briefly, the approximately linear relation between propane and nitrogen has disappeared.

The propane curve is seen to have two points where its slope is unity. Only the lower unity point is involved in this discussion. Above the lower point of unity slope, small reductions in temperature produce only small increases in the proportion of feed nitrogen in the liquid, but very large decreases in the proportion of feed propane remaining in the vapor. Below the lower point of unity slope, small reductions in temperature produce progressively smaller decreases in the proportion of propane remaining in the vapor, while the nitrogen rate is virtually unchanged until at a sufficiently low temperature to reduce the propane to a very low value.

It is therefore highly advantageous to effect this partial liquefaction of the gas within a temperature range, the upper limit of which is the lower of the two points of unity of the propane curve. Above this point, propane recovery is seriously impaired by loss of propane to the vapor, with only a trifling benefit in reduction of nitrogen in the liquid.

Inspection of Fig. 3 shows this lower unity slope point to be about at the point of equality of the proportion of feed propane remaining in the vapor and the proportion of total feed liquefied.

The separated vapor passes through conduit 31' to interchanger M in which it is cooled to 142° by expanded fractionator bottoms, then through conduit 32 to interchangers N and X in parallel, in which it is cooled to 127° by streams of expanding liquid methane from two sources, and finally through conduit 33 to fractionating column BB operating at about 220# absolute.

The overhead vapor from the column, at about 122°, is divided into two streams, one of which passes through conduit 34 to interchanger K in which its temperature is raised to 147°, then through conduit 35 to a reciprocating or turbo expander CC by which its pressure is reduced to 22# and its temperature to 90° K. The expanded stream passes through conduit 36 to interchanger G in which its temperature is raised to 212° in cooling the feed gas stream, then through conduit 37 to interchanger B in which its temperature is raised to 300° in the first cooling of one of the dehydrated gas streams, and is vented from the system through conduit 38 as waste nitrogen containing about 0.5% methane.

The liquid collecting in separator AA passes at 230# and 153° K. through valved conduit 39 to interchanger J, in which its temperature is raised to 172° by interchange against the feed gas stream, then as a mixture of vapor and liquid through valved conduit 40 to second separator DD. The vapor from this separator has approximately the following composition:

|  | Per cent |
|---|---|
| Nitrogen | 7.0 |
| Methane | 91.3 |
| Ethane | 1.6 |
| Propane+ | 0.1 |

This vapor passes at 172° and 220# through conduit 41 and expansion valve 42 to a point of admixture with another flash vapor which will now be described.

The liquid collecting in separator DD has approximately the following molal composition:

|  | Per cent |
|---|---|
| Nitrogen | 0.6 |
| Methane | 47.9 |
| Ethane | 27.0 |
| Propane+ | 24.5 |

This liquid passes through conduit 43, at 172° and 220#, to interchanger E in which its temperature is raised to 205°, then as a mixed vapor and liquid through valved conduit 44 to a third separator EE. The vapor separating in this tank has approximately the following composition:

|  | Per cent |
|---|---|
| Nitrogen | 1.4 |
| Methane | 87.7 |
| Ethane | 10.1 |
| Propane+ | 0.8 |

In lieu of elevating the temperature of the liquid from separator AA in order to produce a flash vapor in separator DD, it is permissible and sometimes desirable to by-pass the liquid around interchanger J as through conduit 39' and to reduce its pressure as by expansion valve 40'. This expansion leads to reduction in temperature and partial vaporization.

As in the previous instance, it is permissible and may be desirable to by-pass interchanger E as by means of conduit 43' (valve 44' being closed) and to reduce the pressure as by means of expansion valve 44''. This expansion also leads to reduction in temperature and partial vaporization.

It will be noted that the substitution of pressure reduction for temperature elevation at either point will lead to change in composition of all succeeding vapor and liquids, and that the compositions given are such as obtain in the use of the heating step at both points.

The vapor from separator EE passes through conduit 45 to a point of junction with conduit 41, the mixed stream passing at 181° K. through conduit 46 to interchanger C, in which it is heated to about 300° in cooling one of the feed gas streams. The warmed stream at about 205# passes through conduit 47 to flash vapor compressor 48 by which its pressure is raised to 240# and, after cooling to atmospheric temperature in aftercooler 49 is passed to the purified gas outlet through conduit 50.

If it is desired to have the purified gas delivered to the pipe line in the highest degree of freedom from nitrogen, the mixed flash gas delivered by conduit 50 may be kept separate from the purer gases resulting from fractionation and utilized as fuel, for example in the operation of the plant. This mixed flash gas has a nitrogen content of about 5.5% whereas the products of columns BB and FF contain 0.5% and 0.12% nitrogen respectively.

The liquid collecting in the third separator EE has approximately the following composition:

|  | Per cent |
|---|---|
| Nitrogen | Trace |
| Methane | 20.4 |
| Ethane | 38.8 |
| Propane+ | 40.8 |

This liquid passes at 205° and 210# through conduit 51 to deethanizer feed pump 52 by which its pressure is raised to 560# and its temperature slightly elevated. The high pressure liquid stream passes through conduit 53 to interchanger D in which its temperature is raised to 267° in cooling one of the feed gas streams, then through conduit 54 to interchanger O in which it is heated to 283° by interchange with compressed gaseous ethylene in a cascade refrigerating system later described, the stream then passing through conduit 55 to a deethanizing column FF.

This column, operating preferably at about 550#, has the usual reboiler 56 heated by steam introduced at 57. The vapor leaving the column through conduit 58 is partially liquefied in reflux condenser P by expanded and evaporating liquid ammonia produced in the cascade refrigerating system. The liquid and vapor pass through conduit 59 to an accumulator 60 at about 270° K. The liquid is withdrawn through conduit 61 by reflux pump 62 and is returned through conduit 63 to the upper end of the column, the quantity, vaporizing pressure, or both, of the ammonia passing through P being regulated to provide the requisite quantity of reflux. The vapor from the accumulator passes through conduit 64, expansion valve 65 and conduit 66 to a junction with conduit 50 and thus to the stream of purified gas leaving the system.

The liquid drawn from reboiler 56 through conduit 67 is directed to any suitable fractionator for separation into desired liquid products. This liquid contains substantially all of the propane and heavier hydrocarbons originally carried by the feed gas.

Returning now to fractionating column BB, this column is provided with the usual reboiler 68 which is heated by compressed and previously cooled gaseous methane circulating in a methane transfer circuit later described. The liquid product of the column, drawn from the reboiler through conduit 69 at 158° K. and 220#, passes to interchanger M through an expansion valve 70 by which its pressure is reduced to about 50# and its temperature to 129°. From this interchanger, in which it withdraws heat from the vapor stream leaving separator AA while itself vaporizing at constant temperature, the fractionator bottoms passes through conduit 71 to interchanger L in which it withdraws heat from the partially cooled gas stream and is heated to about 156°. It then passes through conduit 72 to interchanger H in which it is again interchanged with the feed gas stream and is further warmed to about 172°. The warmed stream, now completely vaporized, passes through conduit 73 to a turbo or other expander 74 by which its pressure is reduced to about 36# and its temperature to 166° K. The expanded stream passes through conduit 75 to interchanger A in which it is heated to about 300° K. in partially cooling one of the streams of feed gas.

The warmed and vaporized stream of fractionator bottoms passes through conduit 76 at about 30# to compressor 77, is compressed to about 85#, cooled in intercooler 78, further compressed to 240# in second stage compressor 79, and again cooled in after cooler 80. The compressed stream then passes through conduit 81 to a junction with conduit 66 and thus out of the system as part of the make of purified gas.

The stream discharged at 82, a mixture of the bottoms from column BB, the tops from column FF and the vapors from separators DD and EE, is the purified gas to which the operation is directed, having approximately the following composition:

|  | Per cent |
|---|---|
| Nitrogen | 2.7 |
| Methane | 89.3 |
| Ethane | 7.9 |
| Propane | 0.1 |

The fractionating column BB is provided with reflux liquid by a closed nitrogen liquefying circuit generally indicated at GG, including the following elements and steps:

Any required quantity of gaseous nitrogen is withdrawn from the top of the column through branch conduit 83 to interchanger Q in which it is heated to 300° K. in cooling a stream of compressed and water-cooled nitrogen. The warmed stream passes through conduit 84 to compressor 85 by which its pressure is raised to about 410#, the stream being then brought back to about 305° K. in aftercooler 86. The nitrogen stream then passes through conduit 87 to interchanger Q, in which it is in counterflow with the stream of cold nitrogen from the column and is cooled to about 127°, then through conduit 88 to interchanger R in which it is liquefied by heat interchange with expanded and evaporating liquid methane. The liquid nitrogen then returns, through conduit 89 and expansion valve 90, to the top of the column, expansion to column pressure vaporizing about one-fourth of the liquid and reducing the temperature to 111° K. at 220# gauge.

The refrigerating system which introduces refrigeration to compensate various losses and which also transfers heat from one stage to another comprises, in addition to nitrogen liquefier GG already described, an ammonia liquefier generally indicated at HH, an ethylene liquefier JJ, a transfer methane circuit KK and a cascade methane circuit LL.

A stream of gaseous anhydrous ammonia is compressed to 52# in compressor 91, cooled to 305° in intercooler 92, compressed to 185# in compressor 93 and liquefied by water cooling in condenser 94. The liquid passes through conduit 95 and expansion valve 96 to a separator MM, maintained at about 52# gauge, the vapor evolved in this separator returning through conduit 97 to the intake of compressor 93.

The stream of liquid ammonia drawn from the separator through conduit 98 is divided, a portion passing through conduit 99 and expansion valve 100 to interchanger P in which it is vaporized at about 15# in liquefying vapor from column FF, the ammonia vapor returning through conduit 101 to the intake of compressor 91.

The other portion of the liquid ammonia passes through conduit 102 and expansion valve 103 to interchanger S in which it is vaporized at 15# liquefying a stream of compressed and water-cooled ethylene, the ammonia vapor returning through conduits 104 and 101 to the intake of compressor 91.

A stream of gaseous ethylene is compressed to 73# gauge in compressor 105, cooled to 305° K. in intercooler 106, compressed to 332# in compressor 107 and cooled to 305° in aftercooler 108. The compressed stream passes through conduit 109 to two branch conduits 110 and 111, these being provided with temperature-responsive diaphragm control valves 112 and 113. These valves are arranged to maintain the outlet streams from the parallel interchangers at the same temperature.

Conduit 110 directs part of the compressed ethylene stream to interchanger O in which it is in counterflow with the liquid passing from separator EE to column FF and is cooled to 272°, the ethylene stream then passing through conduit 114 to interchanger S in which it is liquefied by expanded and evaporating liquid ammonia.

Conduit 111 directs the remainder of the compressed ethylene to interchanger T in which it is cooled and liquefied by expanded ethylene returning from interchanger F. The liquid streams from interchangers S and T are collected in conduit 115 and pass through expansion valve 116 into ethylene flash tank NN, the vapor separating in this tank returning through conduit 117, at 73# and 201° K., to the intake of compressor 107.

A stream of liquid ethylene drawn from flash tank NN through conduit 118 is divided, a required part of the stream passing through conduit 119 and expansion valve 120, by which it is reduced to about 20# and 174°, to interchanger F in which it is in counterflow with partially cooled feed gas and is vaporized and warmed to 190° K. The stream of ethylene vapor then passes through conduit 121 to interchanger T, in which it withdraws heat from compressed ethylene in circuit JJ, returning at 300° and about 16# through conduit 122 to the intake of compressor 105.

The remainder of the ethylene passes through conduit 123 and expansion valve 124 to interchanger U in which it is vaporized in liquefying cascade methane, returning through conduit 124' to the intake of compressor 105 at about 300° and 16#.

In the transfer methane circuit KK, a stream of gaseous methane is compressed to about 64# in compressor 125, cooled in intercooler 126, compressed to about 275# in compressor 127 and again water-cooled in aftercooler 128, passing thence through conduit 129 to interchanger V in which it is further cooled to about 189°. The stream then passes through conduit 130 to reboiler 68 of fractionating column BB, in which it is cooled to 164°, and liquefied, in supplying heat to the lower end of the column. The liquid stream passes through conduit 131 and expansion valve 132 into flash tank OO which is maintained at 64# and 133°. The vapor separating in this tank returns through conduit 133 to the intake of compressor 127.

The liquid methane collecting in tank OO passes through conduit 134 and expansion valve 135, by which it is reduced to 22# and 117°, to interchanger N in which it produces part of the final cooling of the gas feed stream passing into column BB. The methane vapor produced in this interchange passes through conduit 136, at about 19# and 115°, to interchanger V in which it is heated to about 300° in interchange with compressed and water-cooled methane, returning through conduit 137 to the intake of compressor 125.

In the cascade methane circuit LL, a stream of gaseous methane is compressed to about 83# in compressor 138, water-cooled in intercooler 139, compressed to 473# in compressor 140 and water-cooled to 305° in aftercooler 141.

The compressed methane stream passes through conduit 142 to interchanger W in which it is partially cooled by methane vapor discharged from interchangers R and X, passing then through conduit 143 to interchanger U in which it is cooled to about 180°, and is liquefied, in counterflow with expanded and evaporating liquid ethylene. The liquid stream passes through conduit 144 and expansion valve 145 into flash tank PP maintained at 83# and 138° K. The vapor from this tank passes through conduit 146 to the intake of compressor 140.

The liquid collecting in tank PP passes in part through conduit 147 and expansion valve 148, by which it is reduced to 22# and 117°, to interchanger R in which it is vaporized and warmed to 122° in liquefying compressed nitrogen in circuit GG, passing thence through conduit 149 to interchanger W.

The remainder of the stream of liquid methane leaving tank PP through conduit 147 is diverted through branch conduit 150 and expansion valve 151, by which it is reduced to 22# and 117°, to interchanger X in which it performs part of the final cooling of the feed gas stream entering column BB. The methane vapor produced in interchanger X passes through conduits 152 and 149 to interchanger W. The conjoined methane streams, brought up to about 300° in this interchanger, return through conduit 153 to the intake of compressor 138.

The use of a succession of flashing stages, two or preferably a larger number, is highly desirable as increasing the recovery of propane and heavier hydrocarbons. That is to say, for a gas of given composition, and assuming that the liquid produced by partial liquefaction is flashed down to some given nitrogen content, a plurality of flashes yields a liquid residue richer in propane than a single stage flash, the concentration of propane in the residue increasing, at a diminishing rate, as the number of flashes is increased. The difference in recovery between a single flash and a sequence of two or three flashes to the same nitrogen content ultimately, is often of considerable commercial importance.

I claim as my invention:

1. The method of separating useful groups of components from nitrogen-contaminated natural gas containing propane and heavier hydrocarbons which comprises: partially liquefying said gas and parting a liquid lean in nitrogen from a vapor rich in nitrogen; fractionating said vapor and separating nitrogen from hydrocarbons; partially vaporizing said liquid in a plurality of stages and flashing off a propane-lean vapor in each said stage, and withdrawing from the last of said stages a liquid enriched in propane and heavier hydrocarbons.

2. The method of separating useful groups of components from nitrogen-contaminated natural gas containing propane and heavier hydrocarbons which comprises: partially liquefying said gas and parting a vapor richer in nitrogen and leaner in propane than said gas from a liquid leaner in nitrogen and richer in propane than said gas; reducing the pressure on said liquid in a first stage and flashing off a propane-lean vapor from said stage; adding heat to the liquid residue from said first stage and flashing off a second propane-lean vapor in a second stage, and withdrawing from said second stage a liquid richer in propane and leaner in nitrogen than said nitrogen-contaminated natural gas.

3. The method of separating useful groups of components from nitrogen-contaminated natural gas containing propane and hydrocarbons heavier than propane which comprises: partially liquefying said gas and parting a vapor richer in nitrogen and leaner in propane than said gas from a liquid leaner in nitrogen and richer in propane than said gas; adding heat to said liquid in a first stage and flashing off a propane-lean vapor from said stage; adding heat to the liquid residue from said first stage and flashing off a second propane-lean vapor in a second stage, and withdrawing from said second stage a liquid richer in propane and leaner in nitrogen than said nitrogen-contaminated natural gas.

4. In the manipulation of a stream of nitrogen-contaminated natural gas containing propane and hydrocarbons heavier than propane, the steps comprising: partially liquefying said stream and parting a stream of vapor enriched in nitrogen and lean in hydrocarbons heavier than ethane from a stream of liquid leaner in nitrogen than said natural gas; fractionating said stream of vapor to produce a stream of liquid leaner in nitrogen than said vapor; flashing streams of vapor rich in methane and lean in propane from first said liquid stream in a plurality of stages; fractionating the stream of liquid from the last of said stages to separate a stream of vapor rich in methane and lean in propane from a liquid stream predominantly of propane and heavier hydrocarbons and substantially free from nitrogen; vaporizing second said liquid stream and merging the resultant vapor with one of the streams of vapor from said plurality of stages of flashing to form a stream of gas substantially lower than said contaminated natural gas in concentration of nitrogen and of hydrocarbons heavier than ethane.

5. In the manipulation of a stream of natural gas, the steps comprising: partially liquefying said gas to produce a first liquid and a residual first vapor; separating said first liquid from said first vapor; fractionating said first vapor to produce a second liquid and a second vapor; vaporizing said second liquid to form a third vapor; partially vaporizing said first liquid; parting the residual liquid from a fourth vapor resulting from said partial vaporization, and merging said third vapor with said fourth vapor.

6. In the manipulation of a stream of natural gas, the steps comprising: partially liquefying said gas to produce a first liquid and a residual first vapor; separating said first liquid from said first vapor; fractionating said first vapor to produce a second liquid and a second vapor; vaporizing said second liquid to form a third vapor; partially vaporizing first said liquid in a succession of stages; parting the resultant vapor from the residual liquid in each stage of said succession, and merging said third vapor with the vapor separated in at least one of said stages.

7. In the manipulation of a stream of natural gas, the steps comprising: partially liquefying said gas to produce a first liquid and a residual first vapor; separating said first liquid from said first vapor; fractionating said first vapor to produce a second liquid and a second vapor; vaporizing said second liquid to form a third vapor; partially vaporizing said first liquid; withdrawing a fourth vapor and a liquid residue from said partial vaporization; fractionating last said liquid to produce a vapor and a liquid residue, and merging last said vapor with said third and fourth vapors.

8. In the manipulation of a stream of natural gas, the steps comprising: partially liquefying said gas to produce a first liquid and a residual first vapor; separating said first liquid from said first vapor; fractionating said first vapor to produce a second liquid and a second vapor; vaporizing said second liquid to form a third vapor; partially vaporizing said first liquid in a plurality of stages; withdrawing a vapor and a residual liquid from each of said stages; fractionating the liquid withdrawn from the last of said stages to produce a vapor and a liquid residue, and merging last said vapor with said third vapor and with the vapor from at least one stage of said plurality of stages.

9. In the fractionation of a stream of nitrogen-contaminated natural gas, the steps comprising: dividing said stream into a plurality of branch streams; cooling each of said branch streams; merging said branch streams to form a reunited stream; fractionating said reunited stream to produce a first stream predominantly of nitrogen with a small methane impurity; a second stream predominantly of methane with a small nitrogen impurity and a third stream predominantly of methane plus ethane with a nitrogen impurity greater than that of said second stream, and passing each of said first, second and third streams in heat interchange with one of said branch streams to assist in effecting said cooling.

10. In the separation of a stream of natural gas, the steps comprising: cooling said stream whereby a condensate is formed; parting a stream of said condensate from a stream of residual vapor; partially vaporizing said condensate stream in a plurality of steps; parting a stream of vapor from a stream of residual liquid after each of last said steps, and effecting said partial vaporization in at least one of the last said steps by passing the condensate stream from a preceding step in heat interchange with said natural gas stream.

11. In the separation of a stream of nitrogen-contaminated natural gas, the steps comprising: progressively cooling said stream whereby a hydrocarbon-containing condensate is formed; parting a stream of residual vapor from a stream of said condensate; further cooling and at least partially liquefying said vapor stream; fractionating last said stream; withdrawing a high-boiling liquid product stream from said fractionation; vaporizing and superheating said product stream by heat interchange with at least a portion of said residual vapor stream prior to said fractionation and with said natural gas stream; expanding said product stream with the production of external work whereby last said stream is cooled; and superheating said expanded product stream by heat interchange with at least a portion of said natural gas stream to assist in said progressive cooling.

12. In the fractionation of a mixed gas stream, the steps comprising: effecting a cooling of said stream by heat interchange with a stream of an expanded and boiling higher-boiling product of said fractionation; dividing first said stream into two branch streams; cooling one of said branch streams by heat interchange with a stream of an expanded and boiling extraneous refrigerant; cooling the other of said branch streams by heat interchange with a stream of expanded and boiling liquid refrigerant which has been liquefied in imparting heat to said fractionation; merging said cooled branch streams; fractionating the merged stream to produce said higher boiling product, and withdrawing said product stream from said fractionation.

13. In the fractionation of a natural gas, the steps comprising: cooling said gas to partial liquefaction in a plurality of steps; parting the resultant liquid from the residual vapor; fractionating the residual vapor to produce a product rich in the lower-boiling hydrocarbon components of said natural gas; flashing off a vapor from first said liquid to leave a residual liquid; heating said residual liquid by heat interchange with said natural gas in one of said plurality of steps; fractionating said heated residual liquid to produce a product rich in the lower-boiling hydrocarbon components of said natural gas.

LEE S. TWOMEY.

References Cited in the file of this patent

UNITED STATES PATENTS

| Number | Name | Date |
|---|---|---|
| 668,197 | Le Seur | Feb. 19, 1901 |
| 1,266,621 | Peterson | May 21, 1918 |
| 1,429,175 | Thompson | Sept. 12, 1922 |
| 1,497,546 | Claude | June 10, 1924 |
| 1,607,322 | Van Nuys | Nov. 16, 1926 |
| 1,620,192 | Claude | Mar. 8, 1927 |
| 2,082,189 | Twomey | June 1, 1937 |
| 2,122,238 | Pollitzer | June 28, 1938 |
| 2,214,790 | Greenewalt | Sept. 17, 1940 |
| 2,265,558 | Ward et al. | Dec. 9, 1941 |
| 2,280,383 | De Baufre | Apr. 21, 1942 |
| 2,475,957 | Gilmore | July 12, 1949 |
| 2,495,549 | Roberts | Jan. 24, 1950 |
| 2,500,118 | Cooper | Mar. 7, 1950 |
| 2,500,129 | Laverty | Mar. 7, 1950 |
| 2,541,569 | Born et al. | Feb. 13, 1951 |
| 2,557,171 | Bedle et al. | June 19, 1951 |

OTHER REFERENCES

Separation of Gases, by Ruhemann (pp. 269–279 relied on).